United States Patent [19]

Gemp

[11] 4,131,936
[45] Dec. 26, 1978

[54] SYMMETRICAL PHASE SHIFTING APPARATUS, DIGITAL DELAYING DEVICE USED THEREIN AND HARMONIC NEUTRALIZED INVERTER SYSTEM USING THE APPARATUS

[75] Inventor: Robert S. Gemp, Williamsville, N.Y.

[73] Assignee: Westinghouse Electric Corp., Pittsburgh, Pa.

[21] Appl. No.: 774,726

[22] Filed: Mar. 7, 1977

[51] Int. Cl.² .......................................... H02M 7/155
[52] U.S. Cl. ...................................................... 363/43
[58] Field of Search ........................ 363/39, 40, 41, 43, 363/71

[56] References Cited

U.S. PATENT DOCUMENTS

| | | |
|---|---|---|
| 3,521,143 | 7/1970 | Anderson et al. ................... 363/43 |
| 3,725,767 | 4/1973 | Corry ................................... 363/43 |
| 3,859,584 | 1/1975 | Corry ................................... 363/43 |
| 3,889,174 | 6/1975 | Corry ................................... 363/43 |

Primary Examiner—William M. Shoop
Attorney, Agent, or Firm—C. M. Lorin

[57] ABSTRACT

A voltage controlled AC static power supply of the harmonic neutralization type uses symmetrical digital phase shifting in order to reconstruct, with pulses of variable width and predetermined different magnitudes generated by inverters, a sinusoidal wave of fundamental frequency. Phase-shifts are obtained digitally from a single pair of frequency signals. Variable length delay lines are used consisting of random-access-memory (RAM) devices in which a selected shift between read and write addresses establishes the desired amount of delay.

7 Claims, 19 Drawing Figures

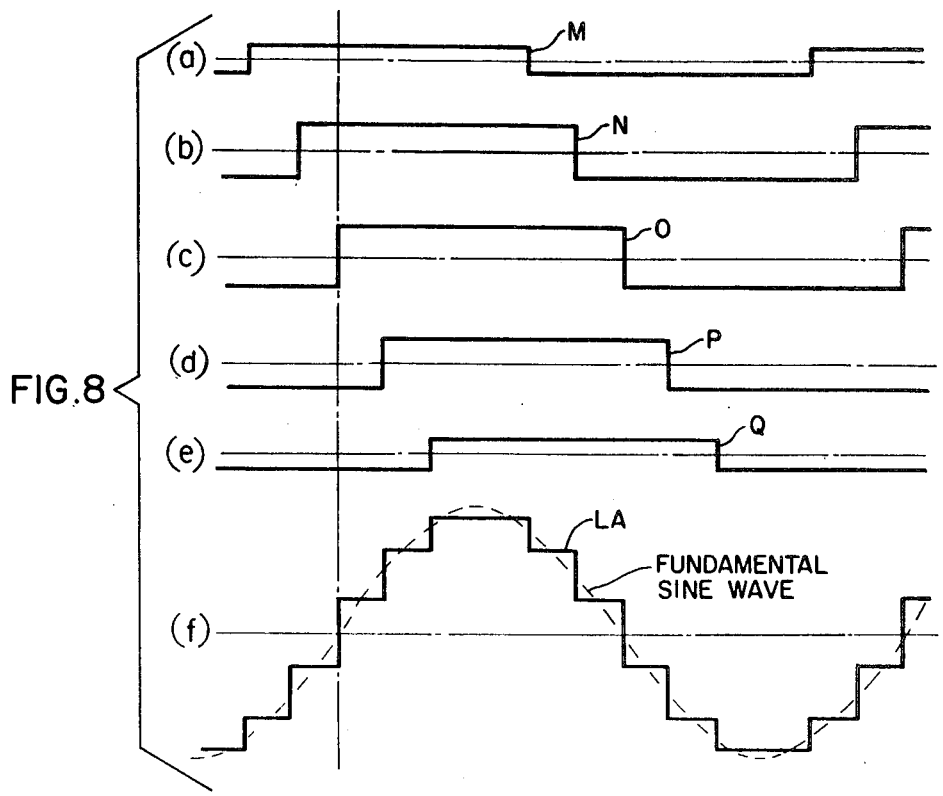
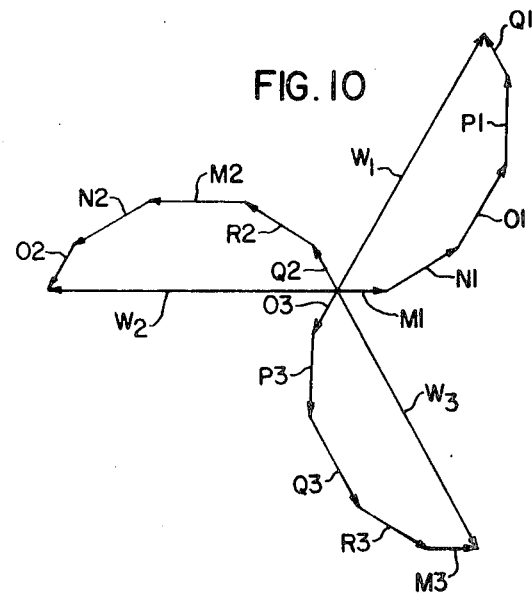
FIG. 9
| TRANSFORMER | WINDING | RELATIVE RATED VOLTAGE |
|---|---|---|
| TM | T1 | √3 |
| TM | T2 | 2√3 |
| TM | T3 | √3 |
| TN | T1 | 3.0 |
| TN | T2 | 3.0 |
| TO | T1 | 2√3 |
| TO | T2 | √3 |
| TO | T3 | √3 |
| TP | T1 | 3.0 |
| TP | T3 | 3.0 |
| TQ | T1 | √3 |
| TQ | T2 | √3 |
| TQ | T3 | 2√3 |
| TR | T2 | 3.0 |
| TR | T3 | 3.0 |

SYMMETRICAL PHASE SHIFTING APPARATUS, DIGITAL DELAYING DEVICE USED THEREIN AND HARMONIC NEUTRALIZED INVERTER SYSTEM USING THE APPARATUS

BACKGROUND OF THE INVENTION

The invention herein described was made in the course of, or under, a contract, or subcontract thereunder, with the Department of the Navy.

The present invention relates to voltage controlled AC static power supplies of the harmonic neutralization type such as disclosed in U.S. Pat. No. 3,491,282 of T. M. Heinrich et al, entitled "Static Inverter Wherein A Plurality Of Square Waves Are So Summed As To Produce A Sinusoidal Output Wave". As explained in the patent, this technique consists in generating, with N inverters, a plurality of pulses of the same amplitude, at the same repetitive rate, spaced from each other between stages of inverters by the same electrical angle $\pi/N$. The outputted pulses are amplified by N respective stage transformers having winding ratios which follow the cosine law from one to the next. The secondary windings are connected in series to sum up the dimensioned pulses, whereby a polyphase output waveform is obtained by vector addition through the transformer secondaries. The Heinrich Patent also describes how the AC output voltage of such a static generator can be controlled by varying the time of conduction of the thyristors in the inverters of each stage. Two modes of controlling the output voltage are disclosed in the Heinrich patent. One mode uses pulse width modulation; the second mode uses phase shifting. The present invention is applicable to this second mode of control of the inverters.

It is known from U.S. Pat. No. 3,750,004 of L. H. Walker to generate a sine wave at a fundamental frequency by means of inverters outputting two identical sets of staggered square waves one leading, the other lagging by the same amount, relative to a reference angle and in proportion to a voltage command, thereby to obtain a requested AC voltage from a constant DC source. The leading and lagging angle is there obtained by adding to, and subtracting a digital voltage command from, a digital reference ramp thus insuring a symmetrical count in either direction.

It is generally known to generate N square pulses staggered by $\pi/N$ from one another with two square pulse signals one at the fundamental frequency, the other in the form of a train of pulses at 2N times the fundamental frequency, the two signals being applied to an N-stage shift register. Such staggered set of pulses may be used in accordance with the harmonic neutralization technique of the aforementioned Heinrich Patent.

Digital delay lines are well known, which are used to introduce a phase delay between two signals, in particular between logic signals each having two opposite logical states as a function of time. For instance, U.S. Pat. No. 3,588,707 of R. A. Manship uses a tapped shift register to create a digital time delay of various length.

It is also known from U.S. Pat. No. 3,760,280 of M. T. Covington to control the delay of an analog signal in response to a control signal by conversion through a voltage controlled oscillator into a binary signal which is frequency modulated, using a shift register as a delay line, which is actuated by a clock.

Further, it is known from U.S. Pat. No. 3,833,854 of R. W. Schonover to count with a common clock the same number of pulses from two different count references in order to create a phase shift between two digital signals equal to the difference between the two count references.

An object of the present invention is to provide a voltage-controlled static AC power supply wherein digital technique is used to symmetrically shift two square pulses and generate a pulse width controlled signal for the purpose of reconstructing a fundamental sinusoidal wave of controlled voltage.

Another object of the present invention is to provide a novel and unique type of digital delay line using random access memory devices.

Still another object of the present invention is to combine delay lines for generating symmetrical phase shifts between digital signals.

A further object of the present invention is to provide an N stage inverter for a harmonic neutralized static power generator in which a double shift register arrangement provides for control of the phase angles of the N inverter stages.

An object of the present invention is also to generate controlled symmetrical phase shifts in two digital signals relative to a common time reference by using variable length random access memory devices.

SUMMARY OF THE INVENTION

The invention resides in a voltage controlled AC static power supply of the harmonic neutralization type using symmetrical phase shifts obtained digitally in order to reconstruct, with N square pulses of variable width spaced a $\pi/N$ and controlling N inverter stages, a sinusoidal wave of fundamental frequency and controlled voltage.

Symmetrical phase shifts are effected on two sets of staggered square waves from a combination of variable length delay lines. The delay lines are of the random-access memory (RAM) type in which variable delay is achieved by controlled shift between the read and write addresses. According to a preferred embodiment, two identical RAM devices are actuated upon under a common clock, but from two different count references while controlling the shifts equally and symmetrically from such two different count references. A constant shift register compensates for such difference in the count references so that a right and a left shift of two fundamental frequency related waves are achieved symmetrically from a common shift reference.

The invention further resides in a novel and unique harmonic neutralized static AC power supply including N inverter stages for reconstructing a sinusoidal wave at a fundamental frequency. The invention comprises right and left channels each used for shifting two basic time waves related to the output fundamental frequency. Each channel includes a corresponding right, or left, shift register responsive to the associated shifted time waves; and said shift registers control in sequence all of the N inverter stages, thereby to establish a desired output voltage for the reconstructed sinusoidal wave due to the time span between control signals from said right and left shift registers.

DESCRIPTION OF THE DRAWINGS

FIG. 8 typically shows curves used to reconstruct a fundamental sinusoidal output wave with the system of FIG. 6;

FIG. 9 is a table of the dimensioning transformer ratios used in the embodiment of FIG. 6;

FIG. 10 is a vectorial representation of the three phase voltage outputted by the circuit of FIGS. 6 and 9;

DETAILED DESCRIPTION OF THE INVENTION

Figure 1:
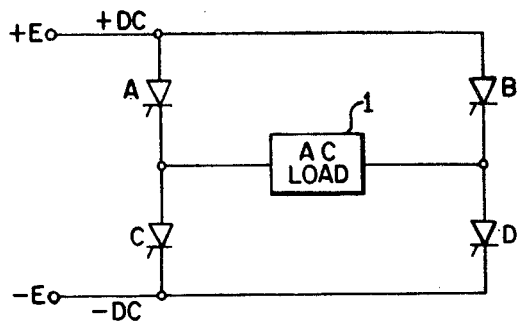
FIG. 1 is a schematic representation of an inverter coupled between a DC source and an AC load.
Figure 2:
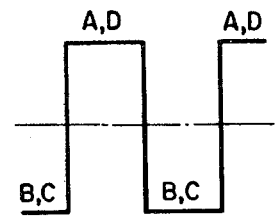
FIG. 2 typically shows as a function of time AC voltage generated by the inverter of FIG. 1.

FIG. 1 is a simplified schematic representation of an inverter circuit using thyristors A, B, C, D as power switching devices connected between the direct current terminals of a DC source having +E volts and −E volts polarities. The alternating current load 1 is alternatively traversed by energy in either direction via pairs of thyristors B,C and A,D as shown in FIG. 2 thereby to generate alternating current.

Control of the voltage at the output of the inverter is schematized by FIGS. 3A-3D and 4.

Figure 3A:
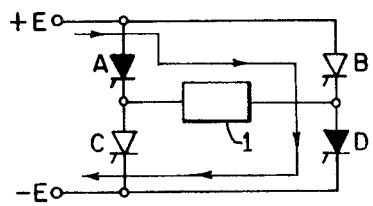
FIGS. 3A-3D illustrate the operation of the inverter of FIG. 1 for voltage control.
Figure 3B:
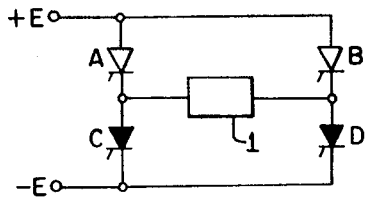
Figure 3C:
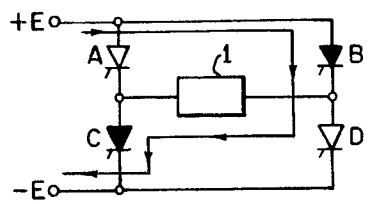
Figure 3D:
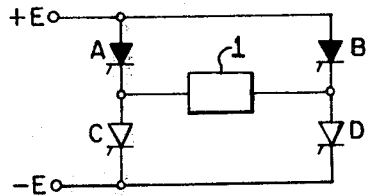
Figure 4:
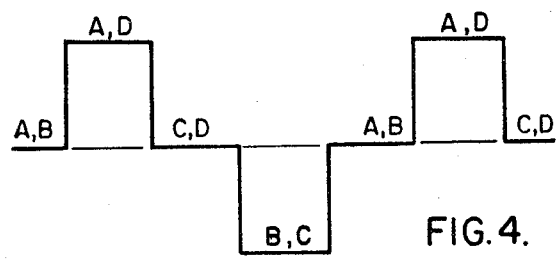
FIG. 4 is the AC voltage generated during pulse width control.

By controlling the time of conduction of thyristors A,D according to the scheme of FIGS. 3A-3D controlled times of conduction (A,D) and (B,C) are obtained representing passage of energy through the load in one and the other direction, as shown in FIG. 4. The overall waveform represents voltage across the load. FIG. 3A shows the positive half cycle (A,D). FIG. 3B illustrates zero voltage due to thyristors C and D being conducting to apply the same voltage at both ends of the load. FIG. 3C shows the negative half cycle (B,C). FIG. 3D is the zero voltage conduction due to concurrent firing of thyristors A,B.

Figure 5:
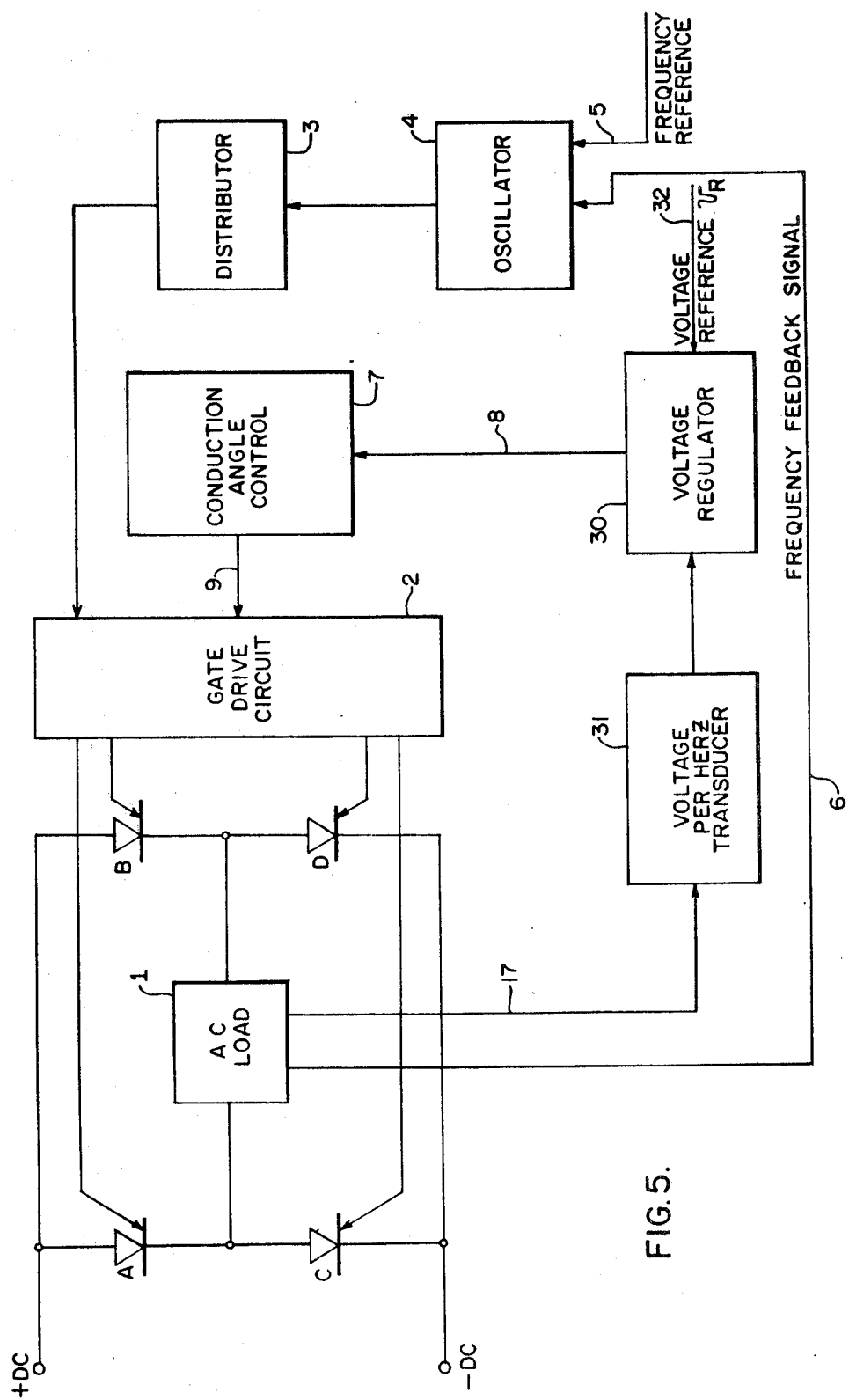
FIG. 5 is a schematic representation of a typical inverter voltage and frequency control system.

Referring to FIG. 5, an inverter circuit such as the one of FIG. 1 is shown coupled to a load 1 and controlled for variable frequency of operation while being voltage regulated. Thyristors A to D are selectively cyclically and sequentially fired by a gate drive circuit 2 in accordance with the logic of a distributor 3 having a cycle frequency defined by an oscillator 4. The frequency of the oscillator is adjusted at various settings by a frequency reference on line 5. If necessary a frequency feedback signal derived from load 1 is applied via line 6 to the oscillator for regulation purpose. A conduction time control circuit 7 is connected to the gate drive circuit 2 in order to establish a desired pulse width for the output wave as has been explained by reference to FIG. 4, thereby to control the voltage across the AC load. For the purpose of illustration only, the inverter circuit of FIG. 5 is shown with a voltage regulator 30 is connected in a close voltage control loop comprising a voltage per hertz transducer 31 responsive to a feedback voltage signal derived from the load on line 17. It is understood that the inverter circuit of FIG. 5 could be of the type in which the output voltage is regulated irrespective of the frequency. The voltage regulator 30 generates a voltage control signal applied via line 8 to the conduction time control circuit 7.

Assuming the frequency of operation constant, any change in the feedback signal of line 17 yields a change in the voltage control signal on line 8 thereby to effectively cause a change in the conduction time, e.g., the electric angle during which DC energy is passing through the load via conducting thyristors, namely, (A,D) or (B,C) on FIG. 4. When the frequency of the oscillator is varied, since the time scale of the wave of FIG. 4 varies with frequency, for the same conduction control condition on lines 8 and 9 to the gate drive circuit 2, the electric angle of conduction of the thyristor is no longer the same under constant pulse width. When the AC load is an induction motor, it is desirable to keep constant flux condition in the motor at all speeds by keeping constant the ratio between the voltage and the frequency of operation of the motor. Referring again to FIG. 4, it is seen that for the same pulse width on lines 8 and 9 the voltage of the AC motor increases when frequency increases, and conversely, if voltage decreases frequency decreases. Therefore, it can be said that when controlling the inverters under a constant pulse width for all frequencies the system will automatically establish on the motor a constant volt per hertz.

These are some of the factors coming into consideration for voltage control by pulse width control.

Figure 6:
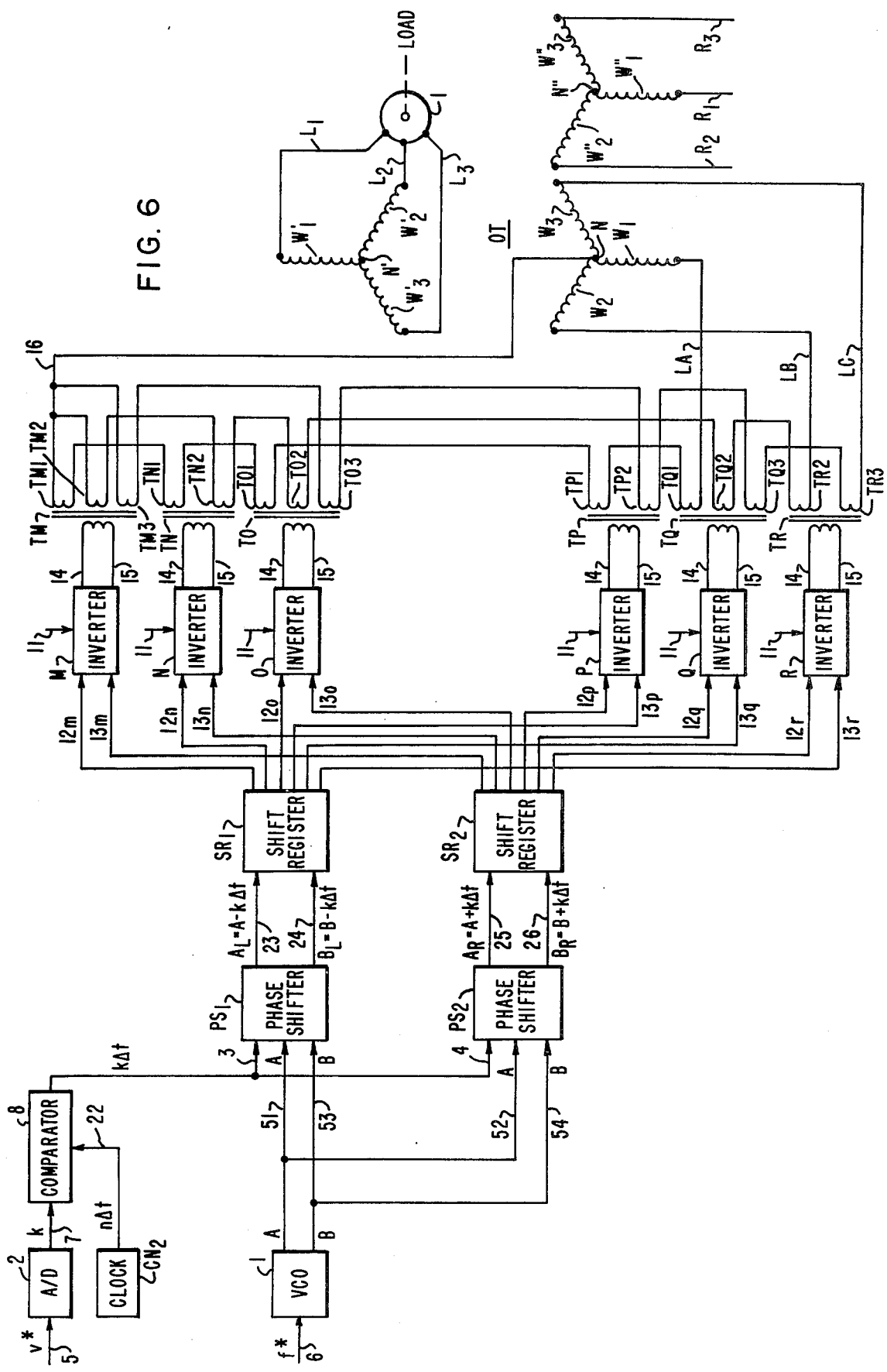
FIG. 6 illustrates the invention in the context of a harmonic neutralization converter system.

Referring to the drawings, FIG. 6 is a schematic block diagram of a DC to AC converter of the type disclosed in the aforementioned U.S. Pat. No, 3,491,282 of T. M. Heinrich et al, embodying voltage control in accordance with the present invention.

Typically, the DC to AC converter of FIG. 6 uses six inverter stages M-R for harmonic neutralization. Each inverter is supplied via line 11 with direct current voltage derived from a rectifier circuit 60 converting the 60 hertz AC power supply into direct current voltage. The inverters are sequentially and cyclically controlled by output signals on lines 12, 13 from respective left and right shift registers $SR_1$, $SR_2$ each including so many lines $12m$ to $12r$ and $13m$ to $13r$, as there are stages. These lines convey at the output from both shift registers sequential signals distributed between the inverters M-R. Shift registers $SR_1$, $SR_2$, together define between paired output lines such as ($12m$, $13m$), a pulse width establishing a period of conduction for the corresponding stage, M-R, of the inverter arrangement.

Timing waves characterized by two signals A and B are individually applied to each of two phase shifters $PS_1$, $PS_2$, each individually set by a corresponding one of two shift registers $SR_1$, $SR_2$. As shown in FIG. 7, signal A is a square pulse at the fundamental frequency of the sinusoidal wave to be outputted and signal B is a square pulse at a frequency multiple of the one of signal A. Signals A and B are conventionally produced by a voltage control oscillator (VCO), as shown in FIG. 6. Phase shifters $PS_1$ and $PS_2$ cause the applied signals A, B to be symmetrically shifted by a given amount. In the case of $PS_1$ the shift is to the left, while through $PS_2$ the shift is to the right. The amount of shift is determined by a control signal $K_t$ applied on lines 3 and 4 to the respective phase shifters $PS_1$, $PS_2$. The control signal $K_t$ is generated by a circuit comprising a digital comparator 8 responsive via line 22 to a counter $CN_2$ and to a digital voltage reference K received on line 7. An analog to digital converter 2 responsive to an analog voltage reference signal $v^*$ on line 5 generates signal K. Counter $CN_2$ converts the digital number K into a real time count $K \times \Delta t$, where $\Delta t$ is the elementary time interval or increment of the counter.

A frequency reference signal $f^*$ is applied on line 6 to a VCO, thereby to control the frequency of signals B and A. As shown in FIG. 7, shift registers $SR_1$, $SR_2$ establish two groups of six square pulses similar to signal A but shifted to one another by the time interval $\pi/6$ existing between two successive square pulses B. These two groups are shifted from a reference position defined by signals A and B, e.g., when $K \times \Delta t = 0$. The amount of shift obtained through $PS_1$ is $-K \times \Delta t$ for the left side and through $PS_2$ $+ K \times \Delta t$ for the right side. The first set of control signals appears at the left output of $SR_1$ on lines 12m-12r which are shifted to the left. A second set of control signals appears at the output of $SR_2$ on lines 13m-13r which are shifted to the right. Each inverter is controlled by a single pair of left and right shifted control signals belonging to these two sets, thereby defining a duration of conduction for the thyristors in the inverter (such as A,D and B,C in FIG. 4) which extends equally about a reference position for which $K \times \Delta t = 0$ on lines 3 and 4.

In accordance with the teachings of the Heinrich patent, inverters M-R generate at their respective outputs 14, 15, identical square pulses which are shifted by a phase angle $\pi/6$ between each stage. For the purpose of this disclosure the description of the U.S. Pat. No. 3,491,282 of T. M. Heinrich is incorporated by reference therein. As disclosed in the Heinrich Patent, the square waves generated between lines 14, 15 are amplified by respective transformers (TM-TR). The dimensioning ratios of the transformers follow a cosine law from one stage to the next and the secondary windings of the transformers are combined in series so as to sum up the dimensioned square waves and form a sinusoidal wave such as shown at (f) in FIG. 8 for phase A and output line $L_A$. Typically, with six stages, only five windings TM, TN, TO, TP, TQ are serially connected to provide the sinusoidal wave of one phase. Thus, windings $TM_1$, $TN_1$, $TO_1$, $TP_1$ and $TQ_1$ generate the sinusoidal wave applied to winding $W_1$ between line $L_A$ and neutral point N, for phase A. In the same fashion, for phase B, windings $TM_2$, $TN_2$, $TO_2$, $TQ_2$ and $TR_2$ are serially connected to supply winding $W_2$ with a sinusoidal wave at 120° from winding $W_1$. The third phase $W_3$ is supplied by serially connected windings $TM_3$, $TO_3$, $TP_2$, $TQ_3$ and $TR_3$, respectively. These windings $W_1$, $W_2$, $W_3$ are the primary windings of an output transformer OT. The ratios of the windings of transformers TM, TN, TO, TP, TQ and TR are indicated in a table shown on FIG. 9. FIG. 10 shows graphically how the five vectors dimensioned in accordance with the table are summed up by the serially connected secondary windings, for each phase. The primary winding $W_1$ of the three phase output transformer OT is connected between line $L_A$ and connection 16 to neutral point N. Similarly, windings $W_2$, $W_3$ are connected between neutral N and lines $L_B$, $L_C$ respectively. In FIG. 8, the fundamental sine wave generated for phase A between line $L_A$ and neutral N is shown by reference to the dimensioned square wave (a) to (e) derived from inverters M, N, O, P and Q in accordance with the table of FIG. 9. The secondary of output transformer OT includes windings $W_1'$, $W_2'$, $W_3'$ which supply AC power via lines $L_1$, $L_2$, $L_3$ to the load, namely an induction motor. The motor is operated at variable frequency adjusted by changing the setting of the voltage control oscillator 1 controlling the frequency of signal B. The frequency of the VCO is set by a reference signal on line 6 and regulated if desired by a feedback signal derived from a tachometer coupled on the axis of the motor.

The output on lines $L_A$, $L_B$, $L_C$ depends on the width of the individual square pulses which, as shown in FIG. 8 for phase A, build up the fundamental sine wave. Voltage control has been described in the aforementioned United States patent of Heinrich, and in the paper entitled "Static Inverter With Neutralization Of Harmonics" by A. Kernick, J. L. Roof and T. M. Heinrich presented at the AIEE Aero-Space Transportation Conference in Philadelphia, June 26–30, 1961.

While voltage control has been disclosed in the Heinrich patent either by pulse width modulation or by phase shift, the present invention uses only phase shift modulation.

Voltage transformer VT provides between the secondary windings $W_1''$, $W_2''$, $W_3''$ and lines $R_1$, $R_2$, $R_3$ voltage feedback signals which are applied to a voltage regulator 30 in order to adjust the output voltage on lines $L_A$, $L_B$, $L_C$ in relation to a reference voltage $v_R$ also applied to the voltage regulator 30 through a transducer 31. (See FIG. 5).

The phase shifters $PS_1$, $PS_2$ employ the "time phase" type of logic respectively indroducing a time lead $-K \times \Delta t$ and a time lag $+K \times \Delta t$ for both A and B signals. As a result, any pair of lines 12, 13 outputted by shift registers $SR_1$, $SR_2$, controls the time duration that the DC voltage is applied to the load in each power stage (conduction angle), and the particular symmetrical arrangement ensures that this control is performed in an identical manner for each stage. The outputs on lines 12, 13 are the left and right shifted logic command signals applied as gate control to the inverters thus determining the width of the square pulses used in reconstructing the fundamental outputted sinusoidal wave (see curves (k) and (l) on FIG. 7). The magnitude of such width depends on the amount that the pairs of command signals on lines 12, 13 are shifted from one another which in turn depends on the reference voltage $v^*$. FIG. 7 shows signals on lines 12, 13 are shifted from one another which in turn depends on the reference voltage $v^*$. FIG. 7 shows signals A and B before shifting, then as they appear on lines 23-26 after being shifted. The two sets of command signals on lines 12 and 13 are represented in FIG. 7 as two sets of six staggered square waves (k) and (l). An amount of shift $\alpha$ causes at the input of transformer TM, TN, . . . TR a pulsewidth of 2 α for the inverter output voltage. The time displacement 2 α (α leading plus α lagging) has an operative range of at least 10 to 1, needed for soft start requirements. The resolution to which the controllable time displacement is operative exceeds 1 percent of the range.

Referring again to FIG. 7A it appears that two sets of six-staggered square pulses at the fundamental frequency are generated from curves A and B, which are identical to curve A but are shifted for voltage control, the ones to the right (curves (k)), the others to the left (curves (l)). One set of curves represents voltages applied to the left-hand poles of the N-stage inverter arrangement M-R. The second set of curves represents voltages applied to the right-hand poles of the N-stage inverter arrangement M-R. For voltage control the two sets are shifted symmetrically in time by an amount α, one being advanced, the other being delayed.

This is accomplished by merely shifting the two sets of signals A and B symmetrically in time through $SR_1$ and $SR_2$ as shown by FIG. 6, where $\alpha = K \times \Delta t$. FIG. 7B shows the relationship of the A and B signals when they are shifted relatively to one another in time. $A_R$, $B_R$ are used for the generation of signals (k) and $A_L$, $B_L$ are used for the generation of signals (l). Signals (k) and (l) appear as signal commands on lines 12m-12r and 13m-13r of FIG. 6. The method of shifting signals A and B shown in FIG. 7B has the advantage that synchronism of signals A and B is not affected by shifting, since B is an exact submultiple of A. Therefore, synchronism is automatically achieved for $A_L$ and $B_L$ as well as for $A_R$ and $B_R$.

In FIG. 6 phase shifters $PS_1$ and $PS_2$ are shown to cause shifting of time waves A and B, to the left with $PS_1$ and to the right with $PS_2$ by an amount proportional to K. Actually, a phase shifter can only delay the time wave represented by signal A or B. As will be seen hereinafter by reference to FIGS. 11 and 13, an advance of the time wave is simulated by introducing on both channels a time delay from which the $K \times \Delta t$ shift is counted in two opposite directions, in one channel by subtraction from the reference count, in the other channel by addition to the reference count.

Figure 11:
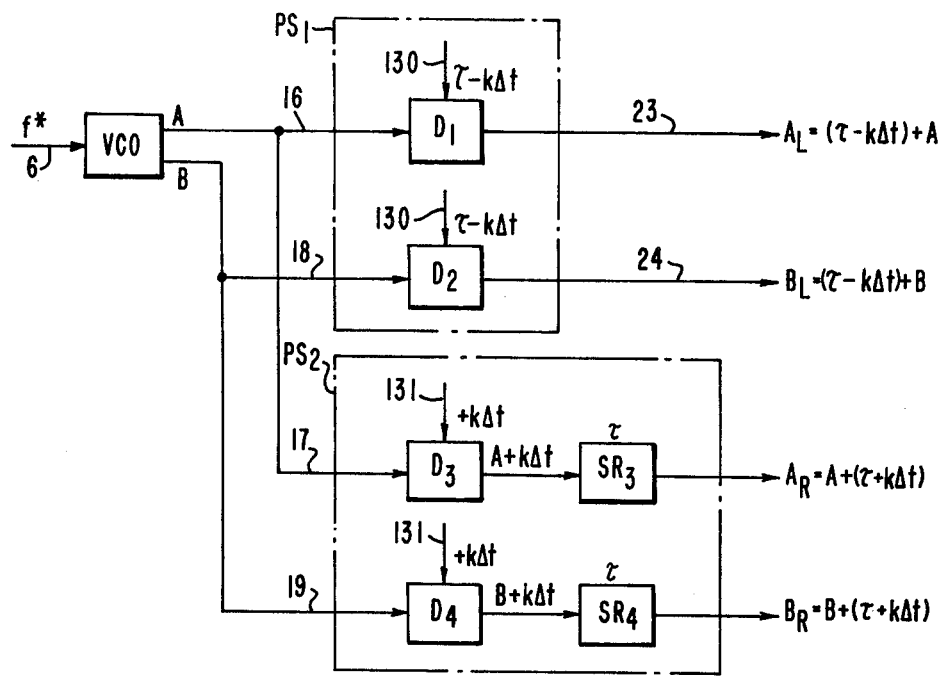
FIG. 11 schematically illustrates the use of variable delay lines to generate symmetrically shifted pairs of signals A and B.

Referring to FIG. 11, signals A and B obtained from the VCO are applied to a pair of delay lines in each channel, $D_1$ and $D_2$ for $PS_1$, $D_3$ and $D_4$ for $PS_2$.

$D_1$-$D_4$ are variable length delay lines controlled to establish a desired amount of delay. $D_1$ and $D_2$ are controlled from line 130 by a signal establishing a delay ($\tau - K \times \Delta t$) where $\tau$ is the above-mentioned reference count. This signal A, derived on line 16 from the VCO appears at the output of $D_1$ as a delayed signal $A_L = A + (\tau - K \times \Delta t)$. It is referred to as a left signal because, relative to the time origin defined by the count reference t, the shift is to the left by the amount $K \times \Delta t$. In a similar fashion, signal B on line 18 from the VCO experiences, through delay line $D_2$, a delay $\tau - K \times \Delta t$ so that $B_L = B + (\tau - K \times \Delta t)$. Considering now the right channel, variable length delay lines $D_3$ and $D_4$ are controlled from line 31 so as to effect merely a delay $K \times \Delta t$. As a result, signal A on line 17 to $D_3$ is delayed to provide at the output a signal $A + K \times \Delta t$. Also, $D_4$ responds to the B signal on line 19 to pass $B + K \times \Delta t$.

Phase shifter $PS_2$ also includes a shift register $SR_3$ which is responsive to the delayed signal ($A + K \times \Delta t$), and a shift register $SR_4$ which is responsive to the delayed signal ($B + K \times \Delta t$). If the delays introduced by $SR_3$ and $SR_4$ are both equal to $\tau$, the outputted signals are $A_R = A + (K \times \Delta t + \tau)$ and $B_R = B + (K \times \Delta t + \tau)$. It appears that, from the same above-mentioned count reference $\tau$, the shifts are $+K \times \Delta t$ to the right for signals $A_R$ and $B_R$ and $-K \times \Delta t$ to the left for $A_L$ and $B_L$.

Figure 12:
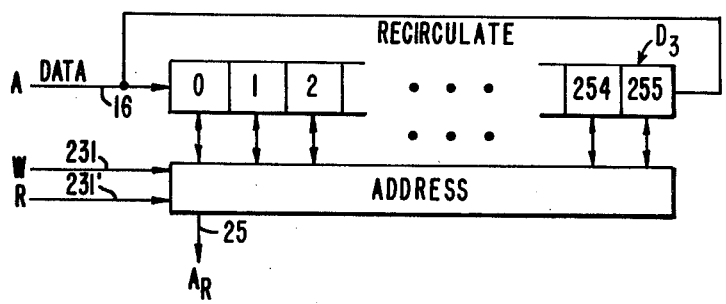
FIG. 12 typically shows a digital memory used in circuit length as a delay line for the generation of the right shifted signal $A_R$ of FIG. 11.
Figure 13:
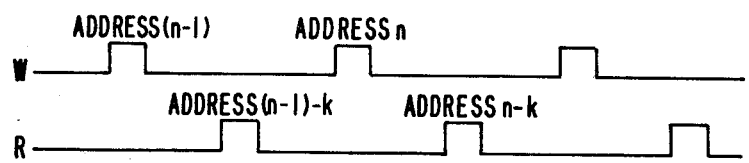
FIG. 13 depicts the write and read signals used to control the amount of delay $\alpha$ between signal A and signal $A_R$ in the example of FIG. 12.

In order to implement digitally the method just described, a novel and unique type of delay line has been conceived. Variable length delay lines $D_1$, $D_2$, $D_3$ and $D_4$ have n steps defined by n locations in a memory each step representing an elementary time interval$\Delta t$ of counter $CN_2$. Signals A and B are stored in digital form into the memory thus achieving a representation of the function inputted on line 16, 17, 18 or 19. The outputted function of line 23, 24, 25 or 26 is derived by reading, with a read signal R, the information out of the memory, with a time delay introduced by selecting address locations which are lagging by so many locations behind the write signal W. Referring to FIG. 12, delay line $D_3$ is illustrated as a memory of 256 locations. Data representing wave A are inputted sequentially over line 16 and stored successively and progressively into all the memory locations, from 0 to 255 under control of a write signal W (FIG. 13) applied on line 231 A read signal R (FIG. 13) is applied on line 231 addressing the locations successively but counting with a lag of so many locations representing in real time the delay α between the locations due to signals W and R (FIG. 13).

From a consideration of FIG. 11, it appears that if $\tau$ is made equal to half of the number of locations n of the delay line, it will be possible to introduce such reference count (n/2) $\times \Delta$ t without the need of shift registers $SR_3$, $SR_4$. Then, if all delay lines $D_1$-$D_4$ are the same and include 256 locations, $\tau$ = 128 elementary time intervals $\Delta$ t. The first reading location of A in $D_1$ will be obtained by addressing $D_1$ to location 128 minus K $\times \Delta$ t, thus so many locations therefrom toward the first storing location (to the left). On the other hand, the first reading location of A in $D_3$ will be obtained by addressing $D_3$ to location 128 plus K $\times \Delta t$, thus so many locations therefrom toward the furthest storing location (to the right). The same method is used for signal B into $D_2$ and $D_4$.

Figure 14:
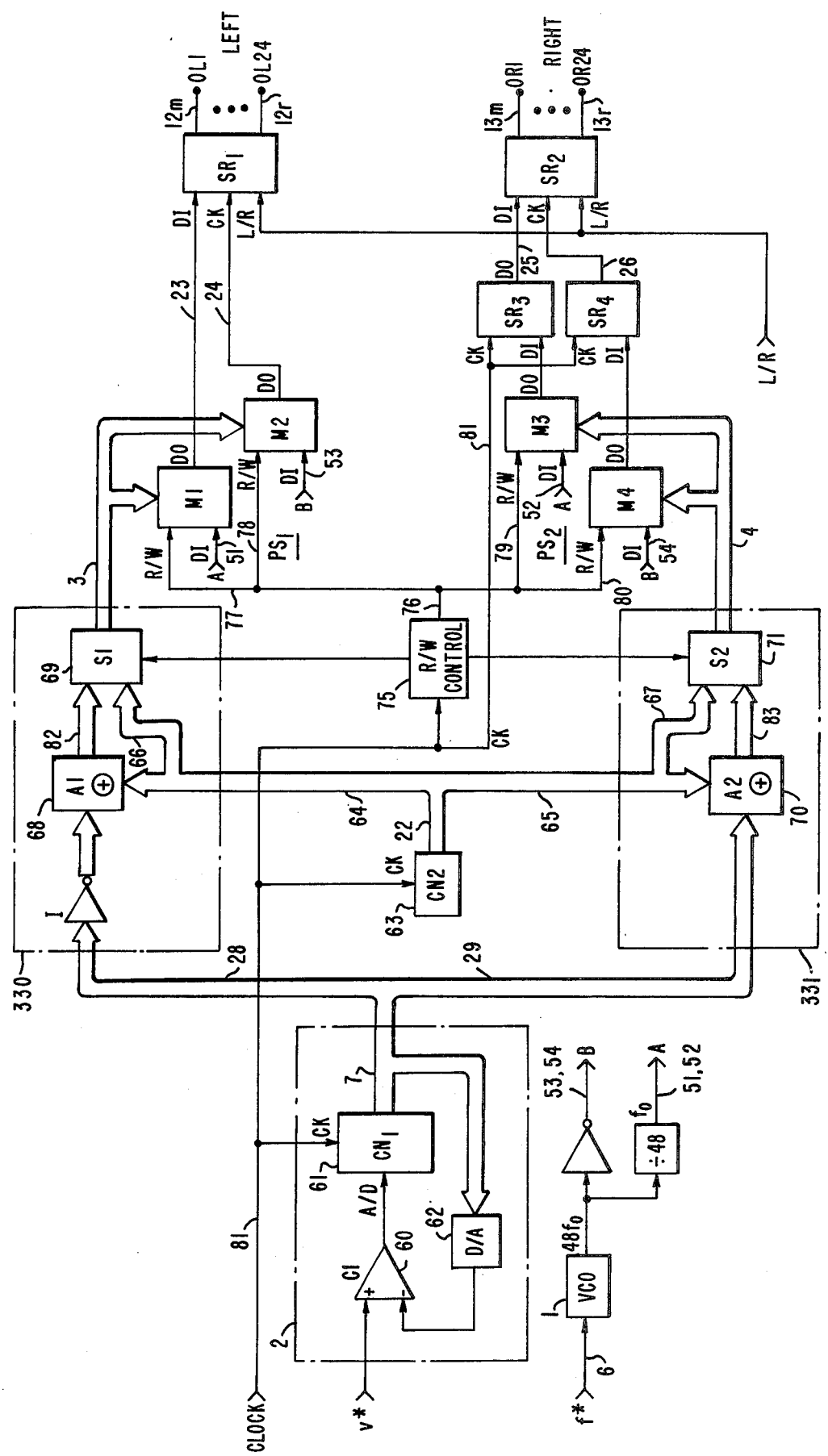
FIG. 14 shows the preferred embodiment of the invention.

For the preferred embodiment of FIG. 14 $\tau$ has been chosen to be the maximum number of locations n in the delay line rather than half of them. Thus, shift registers $SR_3$ and $SR_4$ of n time intervals $\Delta$ t are required. Considering again $D_1$-$D_4$ as identical variable length delay lines such as shown in FIG. 12, the first reading in $D_1$ is effected under ($\tau - K \times \Delta$ t) at the last location 256, while the first reading in $D_3$ is effected under $+K \times \Delta$ t at a location counted at $K \times \Delta t$ from the first location (thus to the right). Shift registers $SR_3$ and $SR_4$ introduce relative to $D_3$ and $D_4$ a constant delay equal to 255 times the elementary time interval $\Delta$ t provided by the clock, thus $\tau$ as delay.

DESCRIPTION OF THE PREFERRED EMBODIMENT

The preferred embodiment of the invention will now be described with particularity by reference to FIG. 14.

Referring to FIG. 14, a control system for a six-stage inverter belonging to a harmonic neutralization arrangement is shown in which, as seen by comparison with the circuit of FIG. 6, left register $SR_1$ and right register $SR_2$ have six stages with corresponding outputs 12m-12r and 13m-13r, respectively. The six output lines from $SR_1$ are applied to the left poles $OL_1$-$OL_6$ of the inverters and similarly the six output lines from SR$_2$ apply the right shift command signals for the various stages to the right poles OR$_1$-OR$_6$. SR$_1$ and SR$_2$ are solid state devices known in the open market as MC14034. For shift register SR$_1$ the A$_L$ signal is applied from line 23 to the data input of the device. The B$_L$ signal is applied on line 24 to the clock input of the device. The same type of connections exist for shift register device SR$_2$ and input signals A$_R$, B$_R$ on lines 25, 26 thereto. For normal inverter output phase sequence, SR$_1$, SR$_2$ are operated in the shift-right mode. If the reverse phase sequence is desired, the left-shift mode of operation is used. Then signals A$_L$ and A$_R$ are inverted and $\overline{A}_L$ and $\overline{A}_R$ are used toprovide output polarity reversal and unchanged magnitude of the air-gap flux vector for motor drive applications.

Again, by comparison with FIG. 6, the left phase shifter PS$_1$ and the right phase shifter PS$_2$ are shown in FIG. 14 to include memory devices M$_1$, M$_2$, M$_3$, M$_4$ used as equivalent to delaying devices D$_1$, D$_2$, D$_3$, D$_4$ of FIG. 6. Variable length shift registers of 256 steps are not readily available. However, this function is simulated by a 256 bit random access memory RAM. Memories M$_1$ through M$_4$ may consist of four 256 bit RAM's, or two 512 bit RAM's, or one 1024 bit RAM. In the latter case a standard 2102 MOS memory can be used. It is understood that 256 locations is a matter of choice, and taking a larger or lesser number of steps depends upon the particular design.

M$_1$ and M$_3$ receive on respective input outlines 51, 52 a digital representation of signal A. M$_2$ and M$_4$ receive on respective input lines 52, 54 a digital representation of signal B. Signals A and B are generated in digital form from a common VCO circuit 1 operating at 48 times the fundamental frequency f$_o$ of the sinusoidal wave to be outputted. This frequency is established by reference frequency signal f* appearing on line 6. Along one channel from the output of the VCO the signal is inverted in order to produce the B signal on lines 53, 54. A divider by 48 yields on a second channel from the same output signal A which appears on lines 51, 52. Signal A is applied as data to memory devices M$_1$, M$_3$. Signal B is applied as data to memory devices M$_2$, M$_4$. The read and write signals (R, W) of FIG. 13 are generated by a read-write controlcircuit 75. The R/W control circuit 75 is a standard generator network for the proper timing of memory read, write and enable lines. The signals outputted therefrom are applied to the four memories M$_1$-M$_4$ via respective lines 77, 78, 79 and 80.

FIG. 14 also shows on the left-hand side a conventional A/D converter circuit used to generate on lines 7 digital representations of the analog voltage reference signal v* of line 5. Circuit 2 includes an 8-bit up-down digital counter CN$_1$, synchronized with a clock from line 81 in order to generate the digital equivalent of signal v*. Circuit 2 also comprises an operational amplifier comparator 60 from which is derived an input determining the count direction of a counter CN$_1$. A feedback loop including a digital to analog converter 62 is established between the digital output of counter CN$_1$ and the negative input of operational amplifier comparator 60 thereby to form an error signal by difference with the reference signal v* applied at the positive input thereof. This is conventional circuitry.

The circuitry most responsible for the generation of the time delay imposed to the inputted signals A and B of lines 51-54 will now be described in detail.

On line 7, counter CN$_1$ provides a digital count representing signal v* after the error signal due to the feedback loop has established through amplifier 60 a count level corresponding to the new level of the reference v*. On line 7 a count level representing v* is established due to the fact that the digital count of CN$_1$ in the A/D converter 2 cannot change faster than the memories M$_1$-M$_4$ can be written into, or read out. Therefore, a count appears on line 7 which is applied on lines 28 and 29. The signal of line 28 is inverted by I$_1$ and applied in this form to a comparator 330. It is observed here that comparator 8 of FIG. 6 breaks down here into two comparators 330 and 331, one for each channel. The signal of line 29 is directly applied to comparator 331. Comparators 30 and 31 include devices 68 and 70 which are conventional adders known in the open market as CD4008, 4-bit full adder. The count of line 28 is inverted by circuit I$_1$. A free running counter CN$_2$ synchronized with the clock signal on line 81, generates on lines 64 and 65 a digital count representing an accumulated count of elementary time intervals $\Delta t$, $n \Delta t$. Thus, a count n $\Delta$ t is applied to the comparators 330 and 331.

Counter CN$_2$, like counter CN$_1$, is an up-down counter of the type CD4029 but operating in the down mode only. The two adders 68, 70 respectively form, as previously explained, the counts 225 − K $\times \Delta$t and +K $\times \Delta$t. Circuits 330 and 331 also include, at 69 and 71 respectively, selectors S$_1$ and S$_2$ which are used to address the memories either in the writing or in the reading mode as prescribed by the R/W control circuit 75. S$_1$ generates the address to memories M$_1$ and M$_2$, S$_2$ generates the address to memories M$_3$ and M$_4$. Selectors S$_1$ and S$_2$ are preferably solid state devices known on the open market as CD4019. Selector S$_1$ has two inputted digital numbers. One on line 82 from circuit 68 is equal to n$\Delta$t + 255$\Delta$t −K $\times \Delta$t as used for read addresses. The second on line 66 is the counter CN$_2$ output n$\Delta$t used for write addresses. Similarly, selector S$_2$ has two inputted digital numbers, +K$\Delta$t + n$\Delta$t from line 83 and count n $\Delta$ t on line 67 directly from counter CN$_2$. The read-write R/W control circuit 75 is a standard sequential network for proper timing of memory read, write and enable lines. It generates the non-concurrent control signals R, W of FIG. 13. Under W, selector S$_1$ passes the write address n $\times$ $\Delta$ t from line 66 onto lines 3 to memories M$_1$, M$_2$. Under R, selector S$_1$ passes the read address 255 $\Delta$ t −K$\Delta$t + n$\Delta$t to memories M$_1$, M$_2$. The same signals R,W also gate S$_2$ to pass write address n$\Delta$t from line 67, or read address K $\times \Delta$t + n$\Delta$t from line 83, onto lines 4 to memories M$_3$, M$_4$. It is clear from what has been said earlier that R/W control circuit 75 enables alternate storing and reading of the memories M$_1$-M$_4$ to provide a time shift between the representations of A and B, as written under the W signal, and the information readout under the R signal. Therefore on lines 23 and 24 respective signals A + 255$\Delta$t − K $\times \Delta$t and B + 255$\Delta$t − K $\times \Delta$t are generated, while on lines 25, 26 are derived A + K$\Delta$t and B + K$\Delta$t. The organization just described still leaves a time shift of 255 elementary time intervals $\Delta$ t between the K $\times \Delta$t counts of the left and right channels. As explained hereinbefore, register SR$_3$ and SR$_4$ are provided to compensate for this and establish symmetrical shifts −K $\times \Delta$t and +K $\times \Delta$t from a common origin defined by those 255 elementary time interval delays.

Figure 15:
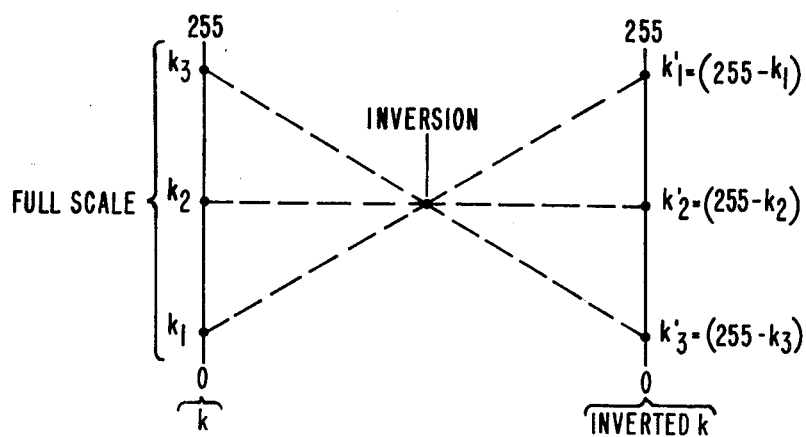
FIG. 15 is a nomograph illustrating the inversion of the binary number controlling the operation of the comparators of FIG. 14.

Referring to FIG. 14, the operation of inverter I$_1$ can be explained as follows:

From A/D converter 2 is derived on lines 7, 28 and 29 a digital signal K. This digital number is converted by inverter $I_1$ into $(255-K)$ as can be seen from the nomograph of FIG. 15. The graph represents on two parallel scales the signals of line 29 at the input of adder 70 and of line 28 at the input of adder 68. The inverting function establishes between these two inputs the relation $K' = (255-K)$ where values $K'$ correspond to line 28 and values K to line 29. Counter $CN_2$ adds the instantaneous count $n\Delta t$ on lines 22 and 64, 65 to values $255-K$ and K so that at the output of adders 68 and 70 counts $(255-K+N)\Delta t$ and $(K+n)\Delta t$ are derived. These are applied respectively to delay lines $M_1$, $M_2$ and $M_3$, $M_4$ as earlier described.

Shift register $SR_3$ receives the data output from memory $M_3$ on line 17 as data input and the clock signal from line 81. The output data on line 25 is the data input for shift register $SR_2$. Shift register $SR_4$ receives the data output of memory $M_4$ and also the clock signal from line 81. The outputted data on line 6 serves as a clock for shift register $SR_2$. Shift registers $SR_3$, $SR_4$ are of fixed length and 256 steps. Two solid state devices known on the open market as MC14562 mounted in series can be used for $SR_3$ or $SR_4$. Any number of single chip units can be used as known in the art.

Figure 7A:
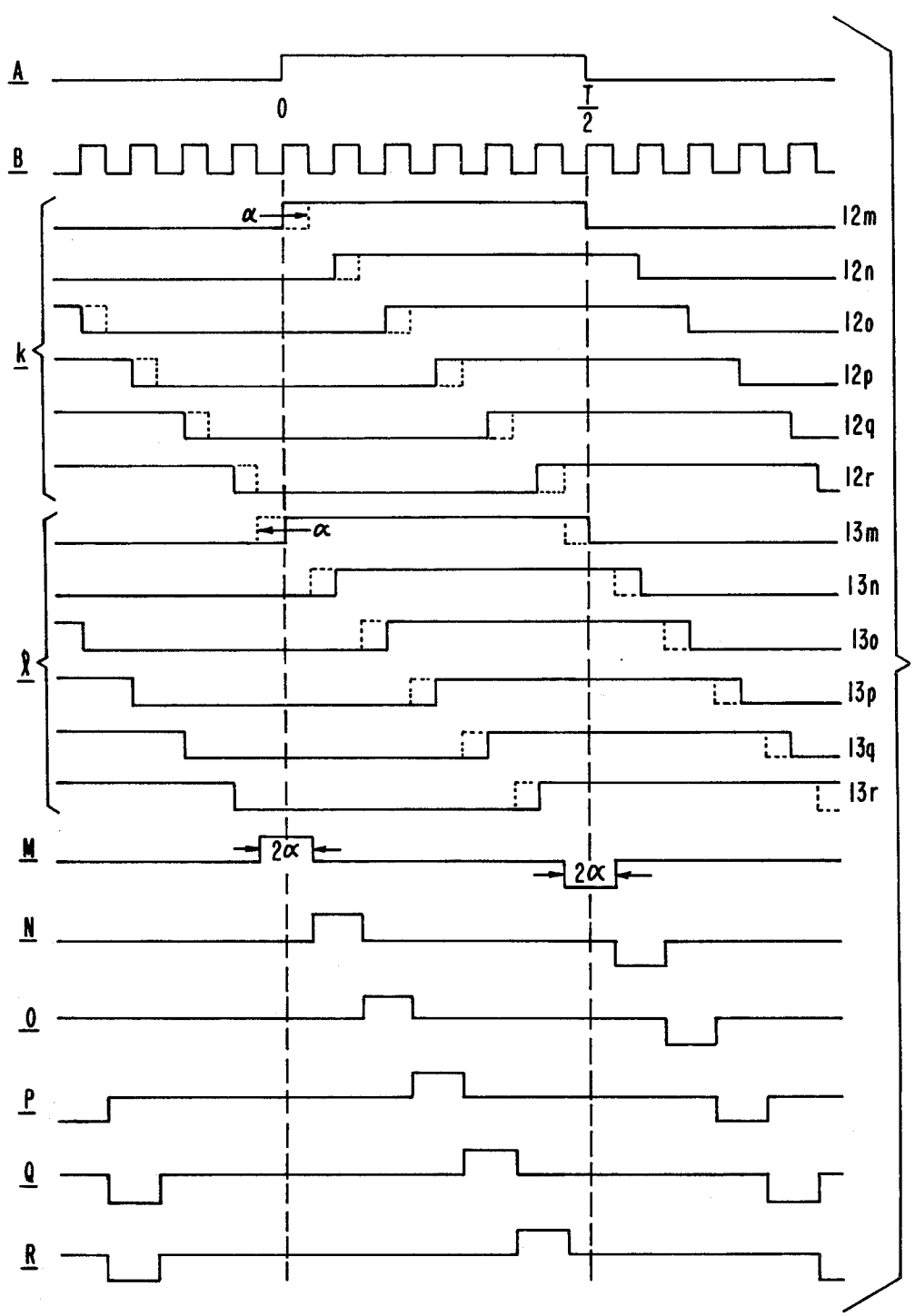
FIG. 7A shows the signals used to control the two phase shifters and the signals derived from the right and left phase shifters of FIG. 6 when generating two symmetrically shifted sets of staggered waves for the purpose of controlling the inverter stages of FIG. 6.
Figure 7B:
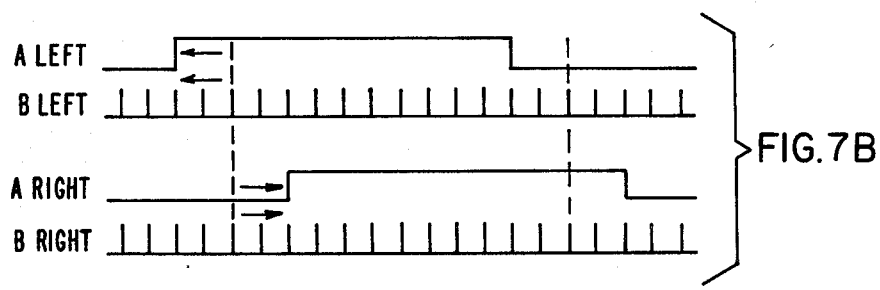
FIG. 7B shows signals A and B in a mode providing relative shifting in order to generate the two sets of staggered waves used to control the inverter stages of FIG. 6.

In order to improve the harmonic contents of the generated reconstructed wave, especially when operating at low frequencies, instead of the full square wave shown in FIG. 7A, signal A may be chosen to include a notch, according to a well known technique. The circuit of FIG. 14 will provide an output wave of improved quality without additional hardware.

More generally the apparatus according to the present invention permits an extensive use of LSI techniques, affords an easy trouble shooting as far as internal time dependent waveforms are concerned. The RAM devices permit a good accuracy in voltage control. The system can be readily expanded from the present 8-bit to 10-bit resolution for voltage control. Also, phase sequence reversal, which is necessary for instance to reverse the direction of the motor of a motor drive, is readily achieved by mere inversion of the sequence of the signals outputted by the shift registers $SR_1$ and $SR_2$. Such reversals are controlled from line 100 by a logic control signal L/R representing either the left or the right direction for the mode of operation and applied to $SR_1$ and $SR_2$.

I claim:

1. In an harmonic-neutralized inverter system for the generation of an alternating wave of fundamental frequency and of voltage magnitude adjusted by phase shift modulation technique in relation to a voltage control signal, including N square wave-inverter stages at $\pi/N$ from one another controlled by conduction control signals spaced by an amount proportional to said voltage magnitude; means responsive to the outputs of said inverter stages for amplifying the same in relation to a cosine function of the stage rank; and means for summing the amplified outputs of said amplifying means to reconstruct said alternating wave of fundamental frequency; the combination of:

first means responsive to one time wave of said fundamental frequency for shifting said one time wave to the left in proportion to said voltage control signal;
second means responsive to said one time wave for shifting said one time wave to the right in proportion to said voltage control signal,
left shift register means responsive to said left shifted time wave for generating a first set of N said conduction control signals shifted to the left by a desired amount;
right shift register means responsive to said right shifted time wave for generating a second set of N said conduction control signals shifted to the right by said desired amount;
each of said N inverter stages being responsive to a corresponding pair of said conduction control signals derived from said first and second sets.

2. The system of claim 1 in which said first shifting means includes variable length digital delay lines controlled by said voltage control signal to generate a predetermined time delay less said desired amount;
said second shifting means includes variable length digital delay lines controlled by said voltage control signal to generate a corresponding predetermined time delay plus said desired amount.

3. The system of claim 2 with said variable length digital delay lines consisting in random access memory (RAM) devices, delay in each of said RAM device being obtained by storing said one time wave therein in digital form and by reading the stored time wave therefrom with a shift between storing address and reading address thereto.

4. The system of claim 3 wherein a second time wave synchronized with said one time wave and of frequency which is a multiple of said fundamental frequency is passed through said first and second shifting means for delaying said second time wave respectively by said predetermined time delay less said desired amount and by said predetermined time delay plus said desired amount.

5. The system of claim 4, wherein said predetermined amount is the full length of the RAM device associated with said first shifting means and with said first and second time waves;
wherein said predetermined amount is zero for the RAM devices associated with said second shifting means and with said first and second time waves,
constant delay shift register means being coupled to said RAM devices of said second shifting means for adding a predetermined time delay equal to said predetermined time delay of said first shifting means.

6. The system of claim 5 in which means is provided for controlling the ratio of the shift by said first shifting means to the shift by said second shifting means, said ratio controlling means being operative on said first and second shift register means.

7. The system of claim 6 in which said first time wave is a square wave and is provided with at least one harmonic content reducing notch therein.

* * * * *